US012794844B2

(12) United States Patent
Oh et al.

(10) Patent No.: US 12,794,844 B2
(45) Date of Patent: Nov. 10, 2026

(54) METHOD, SERVER, AND USER TERMINAL FOR DISPLAYING SUMMARY INFORMATION ABOUT CHAT MESSAGE

(71) Applicant: KAKAO CORP., Jeju-si (KR)

(72) Inventors: Sun Joo Oh, Seongnam-si (KR); Hui Su Kim, Seongnam-si (KR); Heon Seob Seok, Seongnam-si (KR); Min Seok Chae, Seongnam-si (KR); Hee June Kim, Seongnam-si (KR); Dae Seon Kim, Seongnam-si (KR); Seung Hyun Lee, Seongnam-si (KR); Bong Gyun Kang, Seongnam-si (KR); Soo Young Byun, Seongnam-si (KR); Yun Gu Kang, Seongnam-si (KR); Ji Won Choi, Seongnam-si (KR)

(73) Assignee: Kakao Corp., Jeju-si (KR)

( * ) Notice: Subject to any disclaimer, the term of this patent is extended or adjusted under 35 U.S.C. 154(b) by 51 days.

(21) Appl. No.: 18/896,400

(22) Filed: Sep. 25, 2024

(65) Prior Publication Data

US 2025/0126086 A1 Apr. 17, 2025

(30) Foreign Application Priority Data

Oct. 17, 2023 (KR) ........................ 10-2023-0139040

(51) Int. Cl.
*H04L 51/216* (2022.01)
*H04L 51/04* (2022.01)

(52) U.S. Cl.
CPC ............ *H04L 51/216* (2022.05); *H04L 51/04* (2013.01)

(58) Field of Classification Search
CPC ....... H04L 51/216; H04L 51/04; H04L 51/21; G06Q 50/50; G06Q 10/40
See application file for complete search history.

(56) References Cited

U.S. PATENT DOCUMENTS

| | | | | |
|---|---|---|---|---|
| 10,222,933 | B2 * | 3/2019 | Kumar | H04M 1/72403 |
| 11,489,806 | B2 * | 11/2022 | Kheyfets | G06F 3/0482 |
| 2016/0147387 | A1 * | 5/2016 | Rahman | G06F 40/258 715/752 |

(Continued)

FOREIGN PATENT DOCUMENTS

| | | |
|---|---|---|
| JP | 2017-084366 A | 5/2017 |
| JP | 2020-161135 A | 10/2020 |

(Continued)

OTHER PUBLICATIONS

Second Office Action issued in Japanese Patent Application No. 2024-166967 dated Jan. 6, 2026, in 6 pages.

(Continued)

*Primary Examiner* — Angelica Ruiz
(74) *Attorney, Agent, or Firm* — Knobbe, Martens, Olson & Bear, LLP

(57) ABSTRACT

Proposed is a method for displaying summary information about a chat message by a user terminal. The method may include receiving information about a chat room comprising at least one chat message from a server, and requesting the server to summarize a summary target message, which is at least a part of the at least one chat message. The method may also include receiving and displaying summary information about the summary target message from the server.

14 Claims, 16 Drawing Sheets

(56) References Cited

U.S. PATENT DOCUMENTS

| | | | | |
|---|---|---|---|---|
| 2016/0283052 | A1* | 9/2016 | Seo | G06F 3/0482 |
| 2020/0059548 | A1* | 2/2020 | Han | G06F 3/04817 |
| 2020/0396191 | A1 | 12/2020 | Yang | |
| 2021/0218694 | A1* | 7/2021 | Kim | G06Q 10/40 |
| 2023/0031018 | A1* | 2/2023 | Kim | H04L 51/04 |
| 2023/0049085 | A1* | 2/2023 | Xu | G06F 16/285 |
| 2023/0063713 | A1* | 3/2023 | Lukyanenko | H04L 51/046 |
| 2023/0394087 | A1* | 12/2023 | Gibbons | H04L 51/224 |
| 2024/0364653 | A1* | 10/2024 | Giovanardi | H04L 51/04 |

FOREIGN PATENT DOCUMENTS

| | | | |
|---|---|---|---|
| JP | 2021-513777 | A | 5/2021 |
| KR | 10-2019-0096304 | A | 8/2019 |
| KR | 10-2020-0113750 | A | 10/2020 |
| KR | 10-2280488 | B1 | 7/2021 |
| KR | 10-2022-0128013 | A | 9/2022 |

OTHER PUBLICATIONS

Office Action received in Japanese Patent Application No. 2024-166967 dated Jun. 17, 2025.

Office Action received in Korean Patent Application No. 10-2023-0139040 dated Aug. 30, 2025.

Office Action received in Korean Patent Application No. 10-2023-0139040 issued Jan. 5, 2025.

* cited by examiner

METHOD, SERVER, AND USER TERMINAL FOR DISPLAYING SUMMARY INFORMATION ABOUT CHAT MESSAGE

CROSS-REFERENCE TO RELATED APPLICATION

This application claims priority to and the benefit of Korean Patent Application No. 10-2023-0139040 filed on Oct. 17, 2023, the disclosure of which is incorporated herein by reference in its entirety.

BACKGROUND

Technical Field

The present disclosure relates to a method, server, and user terminal for summarizing contents of conversations in a chat room.

Description of Related Technology

With the recent advancements in mobile communication technology and the widespread adoption of portable smart devices, messenger services that provide conversation functionality through instant messages, such as text, images, or voice, have become widely popular.

As various types of information are exchanged through chat rooms in messenger services, the need to share chat room messages with other users has increased.

SUMMARY

The present disclosure may enable a user to send a message through a chat room, generate summary information based on the message, and provide the summary information to users who have not participated in conversations included in the chat room.

The present disclosure may provide summary information necessary to the user by selecting only the messages the user wants among unread messages among chat messages in the chat room.

In one aspect, there is provided a method for displaying summary information about a chat message by a user terminal, the method including: receiving information about a chat room comprising at least one chat message from a server; requesting the server to summarize a summary target message, which is at least a part of the at least one chat message; and receiving and displaying summary information about the summary target message from the server.

The summary target message may be an unread message.

The method may further include: prior to requesting the server to summarize the summary target message, displaying a chat window of the chat room, which includes the at least one chat message and a summary request interface. In requesting the server to summarize the summary target message, a summary request for the summary target message may be generated in response to an interaction with the summary request interface. In receiving and displaying the summary information, the summary information may be included in the chat window or displayed in a form that covers at least a part of the chat window.

In displaying the chat window, the summary request interface may be displayed in an area that separates read messages from unread messages. The summary target message may be an unread message.

The method may further include, prior to requesting the server to summarize the summary target message, displaying a chat room list including the chat room. In receiving and displaying the summary information, the summary information may be included in the chat room list or displayed in a form that covers at least a part of the chat room list.

The method may further include: in response to an interaction with the chat room included in the chat room list, displaying a summary request interface for the chat room. In requesting the server to summarize the summary target message, a summary request for the summary target message may be generated in response to an interaction with the summary request interface.

In displaying the chat room list, the user terminal may display a summary request interface for the chat room in the chat room list when the chat room satisfies a predetermined condition. In requesting the server to summarize the summary target message, the summary request for the summary target message may be generated in response to an interaction with the summary request interface.

The predetermined condition relates to at least one of the following: a type of the chat room, a number of unread messages among the at least one chat message, a read status of the at least one chat message, a speaker of the chat messages, contents of the at least one chat message, a reception time of the at least one chat message, and a specific user mention in the at least one chat message.

Requesting the server to summarize the summary target message may include receiving selection information for selecting the summary target message among the at least one chat message.

The selection information may relate to at least one of the following: a read status of at least one chat message, a speaker of the at least one chat message, a reception time of the at least one chat message, and a specific user mention in the at least one chat message.

The summary information may include at least one summary item. The method may further include: receiving an interaction with any one of the at least one summary item after receiving and displaying the summary information; and in response to the interaction, displaying a message related to the any one of the at least one summary item.

In displaying a message related to the any one of the at least one summary item, the message may be displayed to be distinguishable from other messages in a chat window of the chat room.

The summary information may include at least one summary item categorized by a speaker of at least one chat message.

In the summary information, the speaker of the at least one chat message may be displayed with an anonymized name.

The method may further include: storing the summary information as separate storage information, after receiving and displaying the summary information; and in response to a request to display the stored information, displaying the summary information and information about the chat room.

Requesting the server to summarize the summary target message may be automatically performed when at least one of a chat room and the at least one chat message satisfies a predetermined condition.

The predetermined condition relates to at least one of the following: a type of the chat room, a number of unread messages among the at least one chat message, a read status of the at least one chat message, a speaker of the chat messages, contents of the at least one chat message, a reception time of the at least one chat message, and a specific user mention in the at least one chat message.

When the summary target message includes a predetermined type of message, the summary information may include details about the predetermined type of message.

The predetermined type of message may include at least one of a photo, a video, a multimedia file, a link, a location, and a poll, and the details about the predetermined type of message may include an interface that links to the predetermined type of message.

In another aspect, there is provided a user terminal displaying summary information about a chat message, the user terminal including: a memory storing instructions, and a processor configured to execute the instructions to: receive information about a chat room comprising at least one chat message from a server; request the server to summarize a summary target message, which is at least a part of the at least one chat message; and receive and display summary information about the summary target message from the server.

In yet another aspect, there is provided a method for providing a summary of chat messages by a server, the method including: providing information about a chat room comprising at least one chat message to a user terminal; receiving a summary request for a summary target message, which is at least a part of the chat messages, from the user terminal; generating summary information about the summary target message; and providing the summary information to the user terminal.

In yet another aspect, there is provided a server providing summary information about a chat message, the server including: a memory storing instructions, and a processor configured to execute the instructions to: provide information about a chat room comprising at least one chat message to a user terminal; receive a summary request for a summary target message, which is at least a part of the at least one chat message, from the user terminal; generate summary information about the summary target message; and provide the summary information to the user terminal.

DETAILED DESCRIPTION

As messenger services have become more popular, the number of users has risen, and everyday conversations, as well as various meetings and conferences, are now conducted through these services. When many messages accumulate in a chat room used by a plurality of users, those who are not actively participating in the conversation often find it difficult to efficiently grasp the information contained within the accumulated messages.

In the past, understanding the natural flow of a conversation and generating coherent summary information was often challenging. However, with advancements in AI technology, conversation summarization systems may now produce summaries that are much more accurate and natural than before. Consequently, there is a growing demand for systems that may selectively extract and obtain only the specific information desired, rather than summarizing all the texts.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

As used herein, the singular forms "a", "an," and "the" are intended to include the plural forms as well, unless the context clearly indicates otherwise.

In this application, the described steps may be carried out in any sequence, except in cases where a clearly defined cause-and-effect relationship necessitates a specific order.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Hereinafter, the present disclosure will be described with reference to the attached drawings.

Figure 1:
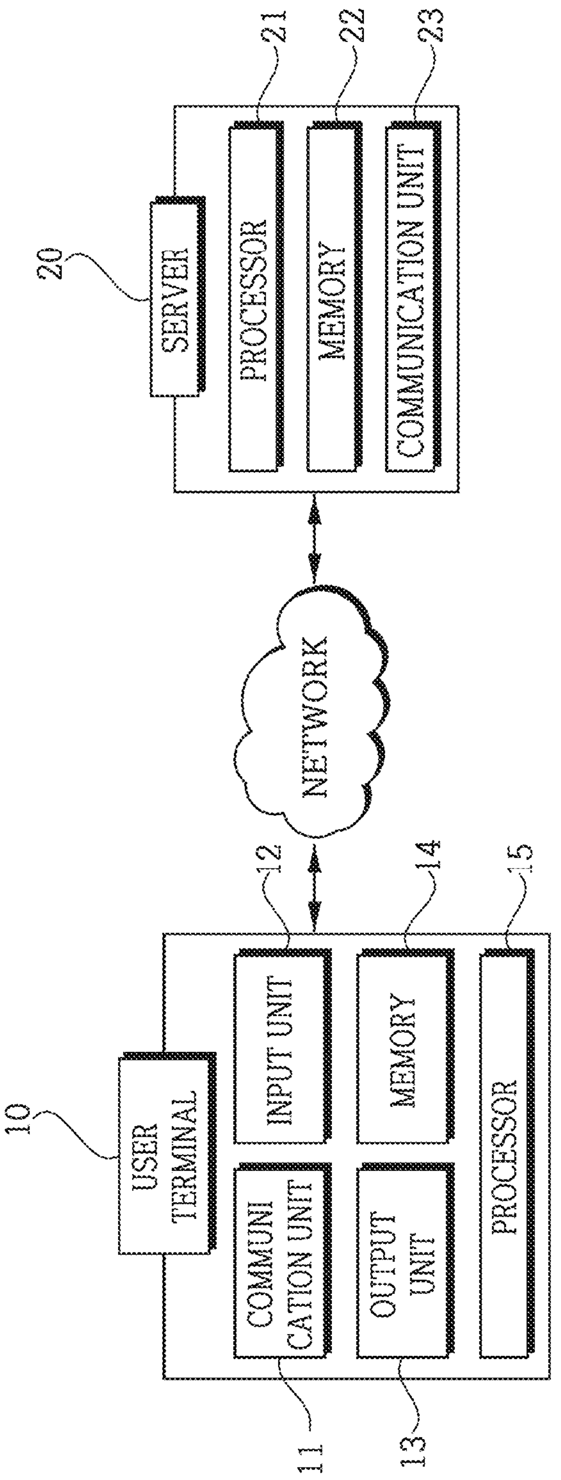
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a user terminal 10 and a server 20. The user terminal 10 may correspond to at least one user terminal 10 connected to the server 20 over a network. In FIG. 1, the user terminal 10 is shown as an exemplary user terminal.

The user terminal 10 refers to a terminal that a user logs into with the user's account registered on the server 20.

The user terminal 10 may be a terminal that a user logs into with the user's account registered with a messenger service, social media service, or social network service (SNS) provided by the server 20. For example, the user terminal 10 may correspond to a PC or smartphone. If the user terminal 10 is a PC, the user terminal may be operated by an operating system such as Windows, macOS, or Linux.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

The user terminal 10 may include a communication unit 11, an input unit 12, an output unit 13, a memory 14, and a processor 15.

The communication unit 11 may communicate with the server 20 or other terminals in a wired/wireless manner.

The input unit 12 may receive various information through the user's manipulation and input actions. The input unit 12 may be a touch screen module, keyboard, mouse, button, camera, stylus, microphone, etc.

The user terminal 10 may receive a user's interaction through the input unit 12. The interaction refers to the act of the user operating the input unit to enter information reflecting the user's selection or intention into a user terminal. For example, the interaction may include touching on a touchscreen, clicking with a mouse, typing on a keyboard, providing voice input through a microphone, capturing an image using a camera, recognizing movements through a motion sensor, and the like.

The output unit 13 may output various information. The output unit 13 may be a display device, a speaker, a vibration generator, a tactile generator, etc. In some cases, the output unit 13 may be devices (e.g., Bluetooth earphones) respectively connected to the user terminal 20 through wired or wireless communication (e.g., short-range radio communication such as Bluetooth) to receive and output signals.

The memory 14 functions as a storage medium and may store a plurality of application programs running on the user terminal 10, as well as data and instructions for operating the user terminal 10. The memory 14 may be provided in the form of any of various hardware storage devices such as an ROM, an RAM, a flash drive, a hard drive, etc. or may be provided in the form of web storage.

In one embodiment, an application related to a messenger service, social media service, or social network service (SNS) may be stored in the memory 14.

The processor 15 may control the overall operation of the communication unit 11, the input unit 12, the output unit 13, and the memory 14 to run the application related to the messenger service, social media service, or SNS.

The user terminal 10 may run the application related to messenger service, social media service, or social SNS, and display summary information about a chat message. The present disclosure relates to the user terminal 10 receiving a chat room including a chat message from the server 20 and displaying summary information in response to a summary request for the chat message from the server 20.

The user terminal 10 may receive information about a chat room including at least one chat message from the server, request the server to summarize a summary target message, which is at least a part of the at least one chat message, and display summary information about the summary target message received from the server.

In this case, a chat message refers to a message generated in a specific chat room where the user is a participant. The chat message may include a received message that the user has received from other users or the server, as well as a sent message that the user has sent. Additionally, the chat message may include an unread message. The user terminal 10 may display the unread message to be distinguishable from a read message(s) in a chat window of the chat room.

The chat room including the at least one chat message may be categorized into a plurality of types. Specifically, the types of chat room may include a 1:1 chat room, a group chat room, a chat room with a server, a chatbot chat room, and a chat room with oneself (My Chatroom). In the present disclosure, the user terminal may be provided with a feature to summarize a chat message differently depending on the type of chat room.

In this case, the summary target message refers to a message that the user terminal requests the server to summarize. The summary target message may correspond to part of chat messages.

The summary target message may include not only a text message but also other types of messages. The other types of messages may be messages including at least one of a photo, a video, a multimedia file, a link, a location, and a poll. When the summary target message includes other types of messages, the summary information may additionally include relevant details.

In this case, the summary request refers to the user terminal requesting summary information that briefly summarizes the summary target message from the server. The user terminal may transmit the summary request to the server in response to receiving an interaction from the user with a summary request interface.

In this case, the summary request interface refers to an interface provided to the user to make a summary request. The summary request interface may be provided in various ways. For example, the summary request interface may be included in a chat window of a chat room. In another example, the summary request interface may be provided to correspond to a chat room in a chat room list.

In this case, the chat room list refers to a list of at least one chat room in which the user is a participant. When the user terminal receives an interaction of selecting one of the at least one chat room from the chat room list, the user terminal may display a chat window of the selected chat room, thereby showing a chat message(s) of the chat room.

In this case, the summary information refers to information summarized based on the content of a unread message(s). The summary information may be generated by the server 20, or may be generated by a separate server as the server 20 requests the summary information from the separate server.

The server 20 may be implemented as a computer device or a plurality of computer devices that provide commands, codes, files, content, services, etc. The server 20 may be a server 20 capable of transmitting and receiving information through communication with the user terminal 10 over a network.

The server 20 may include a processor 21, a memory 22, and a communication unit 23.

The processor 21 controls the overall operation of the memory 22 and the communication unit 23 to provide a messenger service, social media service, or SNS to the user terminal 10.

The memory 22 functions as a storage medium and may store a number of application programs running on the server 10, and data and commands for operation of the server 20. In one embodiment, the memory 22 may store an application program that provides a messenger service, social media service, or SNS.

This memory 22 may be provided in the form of any of various hardware storage devices such as an ROM, an RAM, a flash drive, a hard drive, etc. or may be provided in the form of web storage.

The communication unit 23 may communicate with the user terminal 10 in a wired/wireless manner over a network.

The server 20 of the present disclosure provides information about a chat room including at least one chat message to the user terminal 10, and receives a request for summarizing a summary target message, which is at least a part of the chat message, from the user terminal 10. The server 20 may generate summary information about the summary target message and provide the summary information to the user terminal 10.

Hereinafter, an embodiment of a method for displaying summary information about a chat message by a user terminal 10 of the present disclosure will be described with reference to FIG. 2. The present disclosure relates to a method in which the user terminal 10 displays summary information through a chat room provided by a social media service, messenger service, or SNS.

Figure 2:
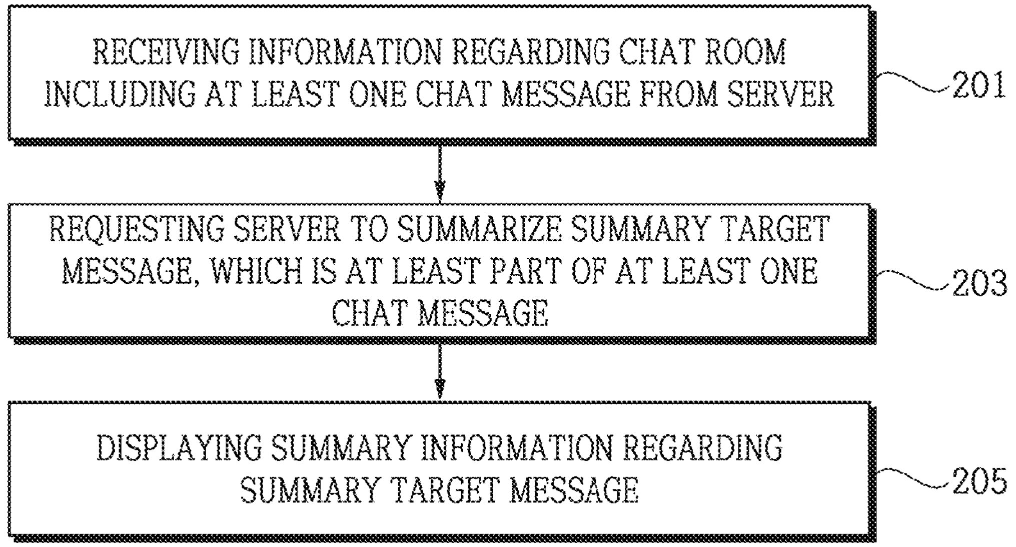
FIG. 2 is a flowchart for explaining a method in which a user terminal of the present disclosure provides summary information through a chat room.

FIG. 2 is a flowchart for explaining a method in which the user terminal 10 of the present disclosure provides summary information through a chat room. First, a method for displaying summary information through a chat room, as performed between the user terminal 10 and the server 20, will be described with reference to FIG. 2.

In operation 201, the user terminal 10 receives information about a chat room including at least one chat message from the server 20.

The server 20 may provide a chat service through the chat room to the user terminal 10. The server 20 may provide the at least one chat message to the user terminal 10 through the chat room. In this case, the at least one chat message included in the chat room may include a received message and a sent message.

The server 20 may provide information about the chat room to the user terminal 10 in various ways. For example, when a new chat message is received through the chat room, the server 20 may provide the user terminal 10 with information (e.g., a push notification for the new message) indicating that the new chat message has been received through that chat room. In some cases, the server 20 may provide the user terminal with information about the received chat message through a chat window or a chat room list.

As another example, even if no new chat message is received in the chat room, the server 20 may provide the user terminal 10 with an entry interface for the chat room through the chat room list or the like. The user terminal 10 may enter the chat room and display the at least one chat message through the chat window of the chat room.

The server 20 may check whether the user terminal 10 has read the at least one chat message. The server 20 may identify a chat message that the user terminal 10 has not read as an unread message.

If there is any unread message in the chat room, the user terminal 10 may distinguish between the unread message and read messages in the chat window. Specifically, the user terminal 10 may display guide information related to unread messages in an area that separates read messages from unread messages. For example, the user terminal 10 may display guide information such as "You have read up to here" or "Following are unread messages" in an area that separates read messages from unread messages.

If there is any unread messages in the chat room, the user terminal 10 may display, in the chat room list, information indicating the presence of the unread messages in the chat room. Specifically, the user terminal 10 may show guide information related to the unread messages in an area corresponding to a chat room with the unread messages in the chat room list. For example, the user terminal 10 may display the number of the unread messages or a part of the unread messages in the area corresponding to the chat room with the unread messages.

In operation 203, the user terminal 10 requests the server 20 to summarize a summary target message which is at least a part of the at least one chat message.

The user may request a summary of the summary target messages by interacting with a summary request interface. A user may specify a chat room and request a summary of summary target messages included in that chat room. Accordingly, the summary request interface may be displayed to correspond to the specific chat room.

The summary request interface may be displayed in various ways. For example, the summary request interface may be displayed in the chat window of the chat room. In another example, the summary request interface may be displayed in an area corresponding to the chat room in the chat room list.

In some cases, the summary request interface may be displayed only when the corresponding chat room satisfies a predetermined condition. For example, when the user has activated a chat message summary feature only for group chat rooms, the summary request interface may not be displayed for 1:1 chat rooms but may be displayed only for group chat rooms.

The summary target message may be determined according to a predetermined method. For example, unread messages may be determined as summary target messages. Specifically, if the number of unread messages included in a specific chat room exceeds a predetermined value (e.g., 20), the unread messages may be determined as summary target messages. In another example, a chat message that satisfies a condition set by the user may be determined as a summary target message. For instance, the user may set a condition related to a read status, speaker, reception time, and specific user mention of a chat message.

When the summary target message is determined according to a predetermined method, the summary request interface may display information about a criterion used to determine a summary target message. For example, if the summary target message is an unread message, the summary request interface may include a text such as "Summarize unread conversation" or "Summarize unread messages."

In some cases, the user may select an individual summary target message from chat messages. Specifically, the user may select a summary target message among chat messages displayed in a chat window. Additionally, the user may select a range of summary target messages by specifying the starting and ending messages in the chat messages displayed in the chat window.

In some cases, the user terminal 10 may request the server 20 to summarize a summary target messages, without a separate summary request interaction from the user. Specifically, when at least one of a chat room and chat messages included in the chat room satisfies a predetermined condition, the user terminal 10 may request the server 20 to summarize the summary target message. In this case, the predetermined condition may relate to at least one of the following: a type of the chat room (e.g., 1:1 chat room, group chat room), the number of unread messages (e.g., more than 20 unread messages), the read status of chat messages, speakers of the chat messages, content of the chat messages, reception times of the chat messages, and a specific user mention in the chat messages.

In operation 205, the user terminal 10 receives and display summary information about the summary target message from the server 20.

The summary information may include at least one summary item. In this case, a summary item refers to details that are summarized based on at least a part of the summary target message. In some cases, the summary information may include a plurality of summary items based on different summary target messages. When the summary information includes a plurality of summary items, the plurality of summary items may be displayed in a bullet-point format. For example, when summary information includes three summary items based on different summary messages, the summary information may be displayed as follows: "1) Sales performance at each branch is on the rise compared to last month, 2) Popular items, including the signature collection AA product and B-brand sneakers, are mentioned, 3) The report to be submitted to the executive board will be prepared by outlining the increase in sales and the result of promoting popular products, along with future plans," with numbers preceding each point.

In addition to the summary items, the summary information may also include an additional feature interface related to an additional feature. For example, the additional feature interface may include a save interface for storing the summary information in the user terminal or server, or a share interface for sharing the summary information with other user terminals.

The user terminal 10 may display summary information in various ways as provided by the server 20. The method for displaying summary information may be determined by how the user interacted with the summary request interface.

For example, the user terminal may display summary information through a chat window of a chat room. Specifically, when the server receives an interaction with the summary request interface via a chat window from the user terminal 10, the server 20 may provide summary information through the chat window. In this case, the summary information may be displayed either within the chat window or in a form that covers at least a part of the chat window. For example, the summary information may be displayed in the form of a window (modal view) covering at least a part of the chat window or may be displayed as a chat message included in the chat window.

In another example, the user terminal 10 may display summary information through a chat room list. Specifically, when the server 20 receives an interaction with the summary request interface through a chat room list from the user terminal 10, the server 20 may provide the summary information within the chat room list. In this case, the summary information may be included in the chat room list or may be displayed in a form that covers at least a part of the chat room list. For example, an area corresponding to the chat room in the chat room list may be expanded, and the summary information may be displayed in the expanded area.

In another example, the user terminal 10 may display summary information through a separate window that is separate from a chat window or chat room list. Specifically, when the user terminal 10 displays the chat window or chat room list on a part of the screen, the user terminal 10 may display a new window on another part of the screen, through which the summary information may be presented.

In addition to displaying the summary item(s), the summary information may include an additional feature. Specifically, when the user interacts with a specific summary item, the user terminal 10 may display a chat message related to the specific summary item within the chat room.

For example, when the summary information includes a plurality of summary items based on different summary messages and the user interacts with a specific summary item, the user terminal 10 may navigate to a chat window where a chat message underlying the specific summary item is located and may highlight the chat message to be distinguished from other chat messages. Specifically, the user terminal 10 may differentiate the chat message by using a different color, shape, or size, or by using an indicator to show that the summary item is based on the chat message.

When the summary target message includes a predetermined type of message, the summary information may include details related to that type of message. In this case, the predetermined type of message may include at least one of a photo, a video, a multimedia file, a link, a location, or a poll.

For example, if the summary target message includes two photos, summary information may include a text such as "There are two photos in the summary target message." Additionally, the summary information may include a link interface that links to the predetermined type of message.

The summary information may include a summary item that summarizes a summary target message in various ways. For example, the summary information may summarize the summary target message based on a speaker or topic of a chat message. A method for summarizing a summary target message may be selected by the user.

Specifically, if the user chooses to summarize a summary target message based on a speaker, the summary information may include summary items categorized by speaker. In some cases, the speaker in the summary information may be displayed with an anonymized name rather than the actual name or chat name.

Hereinafter, a detailed method for displaying a summary request interface on a user terminal 10 and receiving an interaction from a user will be described with reference to FIG. 3.

Figure 3:
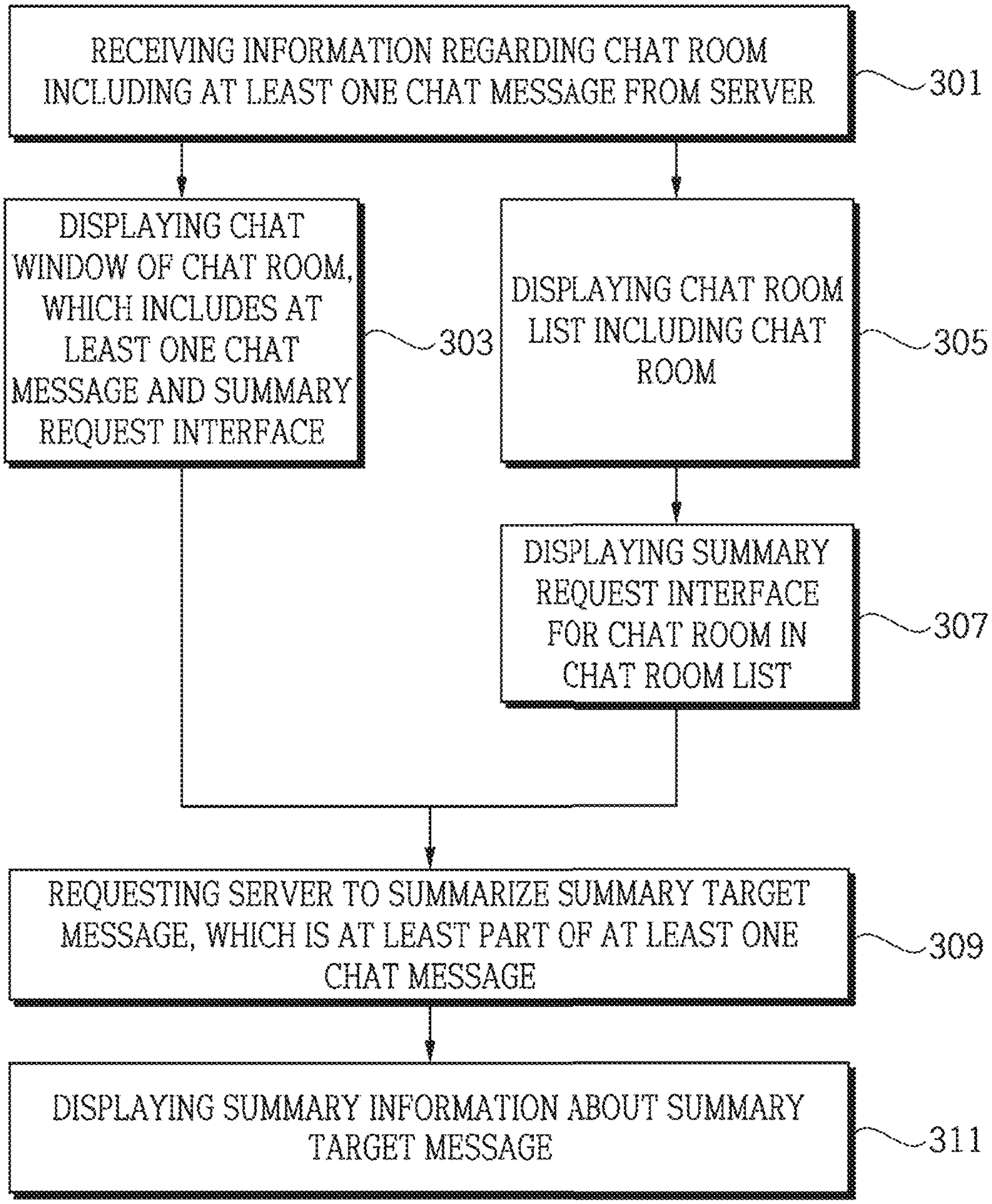
FIG. 3 is a flowchart for explaining a method in which a user terminal of the present disclosure provides summary information through a chat window or chat room list.

FIG. 3 is a flowchart for explaining a method in which the user terminal 10 of the present disclosure displays a summary request interface in a chat window or chat room list. For convenience of explanation, the operations in FIG. 3 substantially identical to those in FIG. 2 will be omitted from the description.

Operation 301 is substantially identical to operation 201 in FIG. 2. After the user terminal 10 receives information about a chat room including at least one chat message from the server in operation 301, either operation 303 or operation 305 may be performed based on a user's interaction.

In operation 303, the user terminal 10 displays a chat window of a chat room, which includes a chat message(s) and a summary request interface.

The user terminal 10 may display a chat window of the chat room in various ways. For example, the user terminal 10 displays the chat window of the chat room, which includes a chat message(s) and a summary request interface. In another example, the user terminal 10 may display a chat window in response to an interaction with a push notification message.

The user terminal 10 may display the summary request interface in the chat window of the chat room. The summary request interface may be displayed in the chat window in various ways. For example, if summary target messages are unread messages, the summary request interface may be displayed in an area that separates read messages from the unread messages. In another example, if the user has selected at least a part of the chat message(s) within the chat window, the summary request interface may be in a form of an interface that displays an additional feature for the selected chat message.

In operation 305, the user terminal 10 displays a chat room list.

The server 20 may provide the user terminal 10 with the chat room list including a chat room(s). The user terminal 10 may display a plurality of chat rooms through the chat room list.

The user terminal 10 may display various information through each chat room. Specifically, the user terminal 10 may display, through each chat room, information on a type of a chat room, the number of participants, a title of the chat room, and the number of unread messages in the chat room.

In operation 307, the user terminal 10 displays a summary request interface for each chat room in the chat room list.

Operation 307 may be performed simultaneously with operation 305. Specifically, when a chat room satisfies a predetermined condition, the user terminal 10 may display a summary request interface for the chat room in the chat room list. In this case, the predetermined condition may relate to at least one of the following: a type of the chat room, the number of unread messages, the read status of chat messages, speakers of the chat messages, content of the chat messages, reception times of the chat messages, and whether a specific user is mentioned.

For example, among predetermined conditions, "the number of unread messages" may correspond to a condition where the number of unread messages is equal to or greater than a predetermined value. For instance, a predetermined condition may be that the number of unread messages is 10 or more. In some cases, the conditions for 1:1 chat room and group chat room may differ. For example, the condition for 1:1 chat room may be a condition where there are 10 or more unread messages. However, the condition for group chat room may be a condition where there are 20 or more unread messages.

In some cases, operation 307 may be performed after a separate user interaction is input following the completion of operation 305. Specifically, in response to an interaction with a chat room included in a chat room list, the user terminal 10 may display a summary request interface for the chat room. In response to an interaction (such as a long press or right-click) with a chat room including summary target messages, the user terminal 10 may display the summary request interface.

Operations 309 and 311 are substantially identical to operations 203 and 205 in FIG. 2.

Hereinafter, examples of a method in which the server 20 summarizes chat messages and provides summary information to the user terminal 10, as described above with FIGS. 2 and 3, will be described with reference to FIGS. 4 to 15.

FIGS. 4 to 15 exemplarily show screens in a process of performing a method for displaying summary information about a chat message by a user terminal 10 according to embodiments of the present disclosure.

Figure 4:
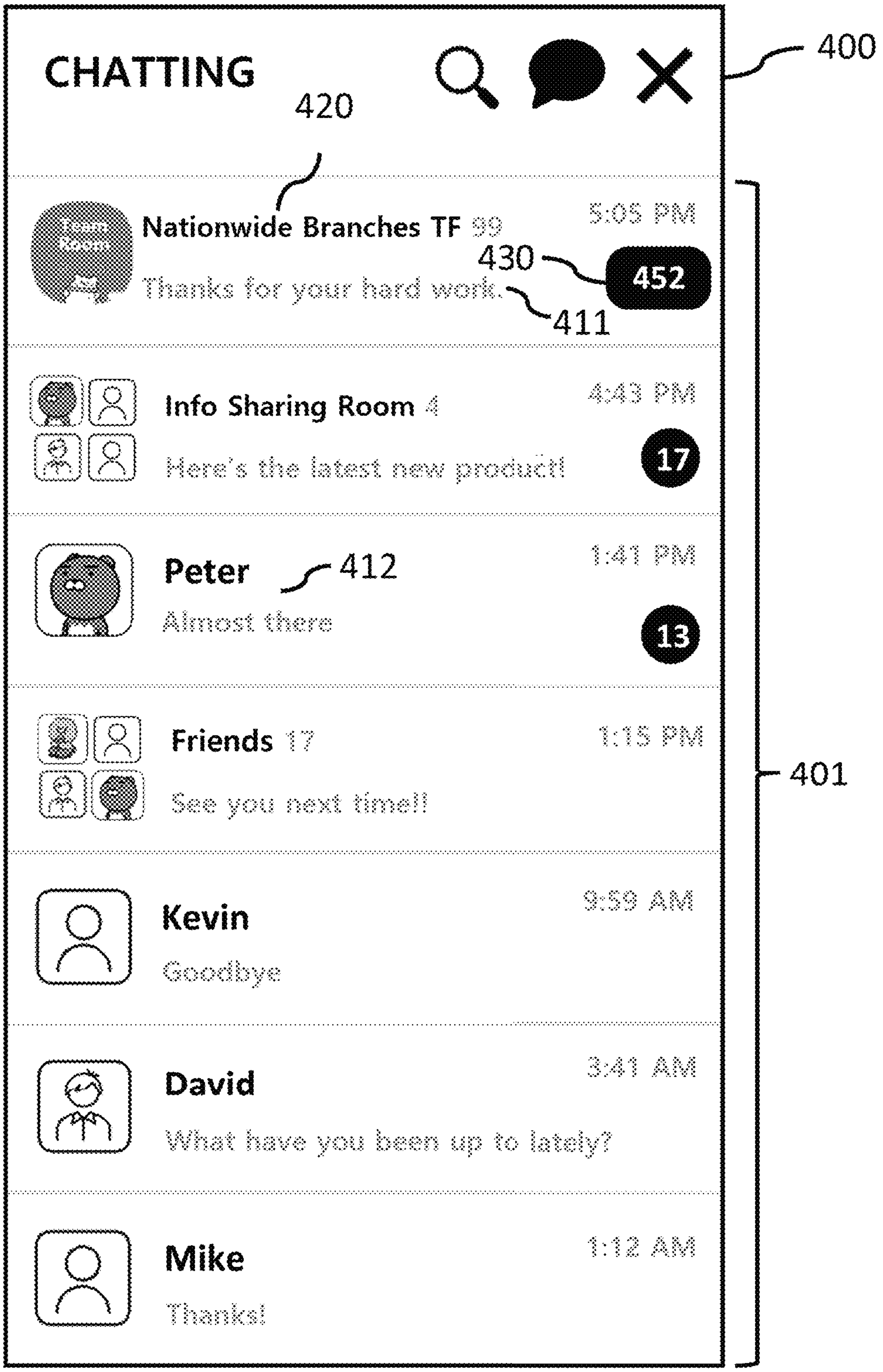
FIGS. 4 to 15 exemplarily show screens in a process of performing a method for displaying summary information about a chat message by a user terminal according to embodiments of the present disclosure.

FIG. 4 shows a screen in which the user terminal 10 displays a chat room list 400 including at least one chat message in order to perform operation 305 of FIG. 3.

Referring to FIG. 4, the user terminal 10 may display the chat room list 400 including a plurality of chat rooms 401. The user terminal 10 may include a 1:1 room 412 and a group chat room 411 in the chat room list 400.

For example, in the chat room list 400, the user terminal 10 may display the 1:1 room 412 including only Peter and the group chat room 411 named "Nationwide Store TF," which includes 99 users and other participants.

Each chat room 411, 412 may include information on a chat room type, information on the number of participants, information 420 on a chat room title 420, and information 430 on the number of unread messages 430. The user may view chat messages upon a request to view the chat room 411, 412.

Figure 5:
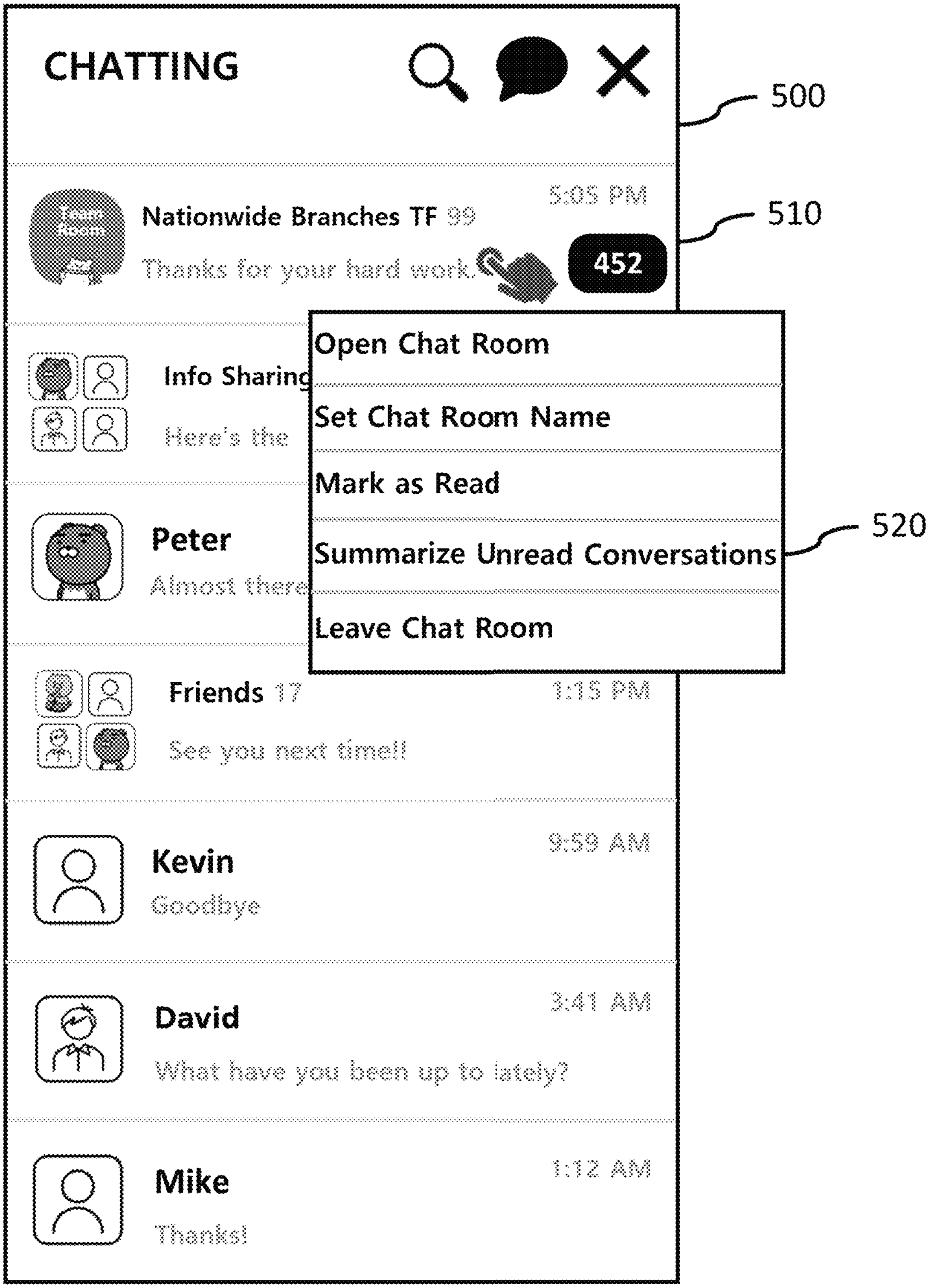

FIG. 5 illustrates that the user terminal 10 displays a summary request interface 520 in response to an interaction with a chat room 510 in a chat room list 500.

Referring to FIG. 5, the user terminal 10 may display a chat room 510 including unread messages in the chat room list 500. Specifically, the chat room 510 may include information on a type of the a chat room 510, information on the number of participants in the chat room 510, information on a title of the chat room 510, and information on the number of unread messages.

In this case, if the user requests to view the chat room including the unread messages, the unread messages may then be marked as read. Accordingly, the user terminal 10 may no longer display information about the number of unread messages in the chat room.

The user terminal 10 may display the summary request interface 520 in the chat room 510 including unread messages in the chat room list. Specifically, the user terminal 10 may display the summary request interface 520 in response to an interaction, such as a long press or right-click, on the chat room 510 that includes unread messages.

In some cases, the user terminal 10 may display the summary request interface 520 only when the number of unread messages satisfies a predetermined condition. For example, the user terminal 10 may display the summary request interface 520 when the number of unread messages is 10 or more.

Figure 6:
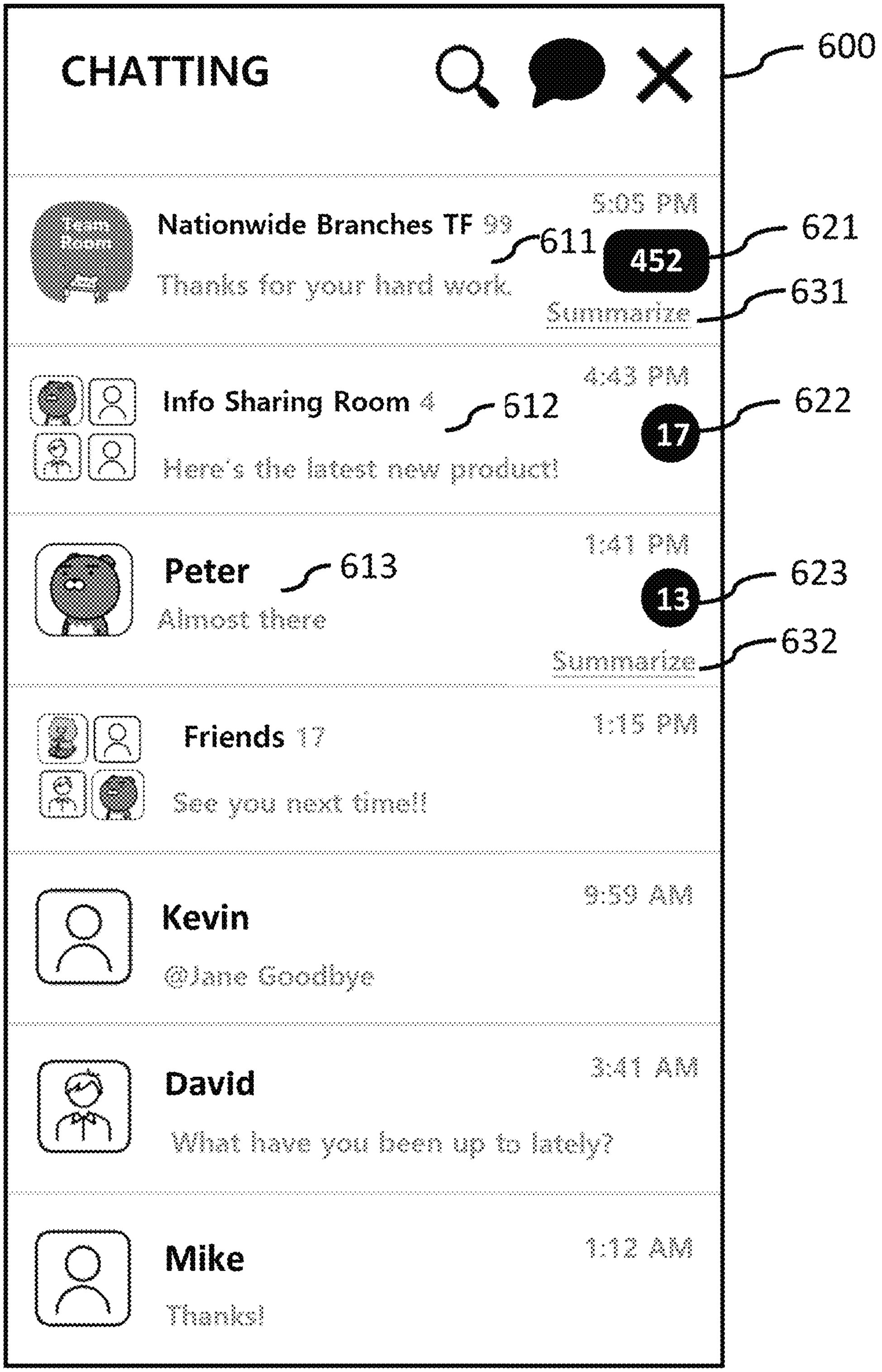

FIG. 6 illustrates a screen where the user terminal 10 displays summary request interfaces 631 and 632 when a predetermined condition is met within a chat room list 600.

Referring to FIG. 6, the user terminal 10 may receive and display chat rooms 611, 612, and 613 including unread messages from the server 10.

When the chat rooms 611, 612, and 613 satisfy a predetermined condition, the user terminal 10 may display summary request interfaces 631 and 632 for the chat rooms on the chat room list 600. In this case, the predetermined condition may relate to at least one of the following: a type of the chat room, the number of unread messages, the read status of chat messages, speakers of the chat messages, content of the chat messages, reception times of the chat messages, and a specific user mention(s) in the chat messages.

For example, the predetermined condition may correspond to a condition where the number of unread messages is more than a predetermined value. In some cases, the conditions for 1:1 chat room and group chat room may differ.

For example, the condition for 1:1 room may be that the number of unread messages is 10 or more. However, the condition for group chat room may be that there are 20 or more unread messages. For example, the number of unread messages in the group chat room "Nationwide Store TF" 611 may be "452" 621, while the number of unread messages in the 1:1 chat room with "Peter" 613 may be "13" 623. In this case, the user terminal 10 may display the summary request interfaces 631 and 632 for the group chat room "Nationwide Store TF" 611 and the 1:1 chat room with "Peter" 613.

However, the number of unread messages in the group chat room "Info Sharing Room" 612 may be "17." In this case, the user terminal 10 may not display a summary request interface for the chat room "Info Sharing Room" 612.

Figure 7:
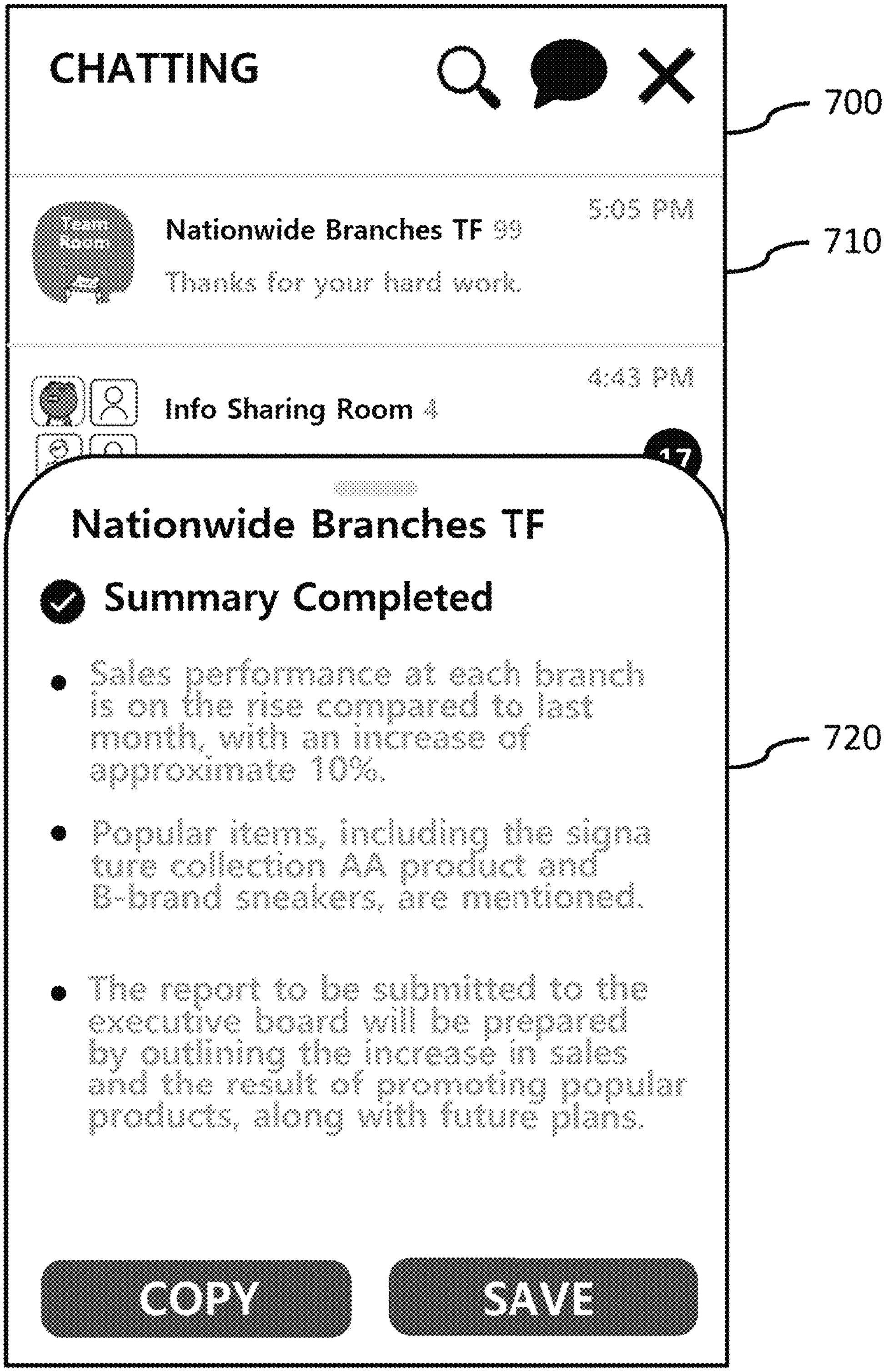

FIG. 7 illustrates a screen where the user terminal 10 displays summary information 720 within a chat room list 700.

FIG. 7 may be displayed when the user terminal 10 obtains an interaction with any of the summary request interfaces 520 and 631 in FIGS. 5 and 6.

Referring to FIG. 7, the server 20 may receive a summary request for a specific chat room 710 from the user terminal 10. Once the server 20 receives the summary request, the user terminal 10 may mark unread messages as read. For example, in response to the user's summary request, the unread messages may be changed to read messages. Therefore, the user terminal 10 may no longer display information about the number of unread messages.

The user terminal 10 may display summary information 720 including at least one summary item within the chat room list 700. Specifically, the user terminal 10 may provide the summary information 720 within the chat room list 700 in response to an interaction with a summary request interface. In this case, the summary information 720 may be included in the chat room list 700 or may be displayed in a form that covers at least a part of the chat room list 700. In some cases, the summary information 720 may be displayed within the chat room itself.

Figure 8:
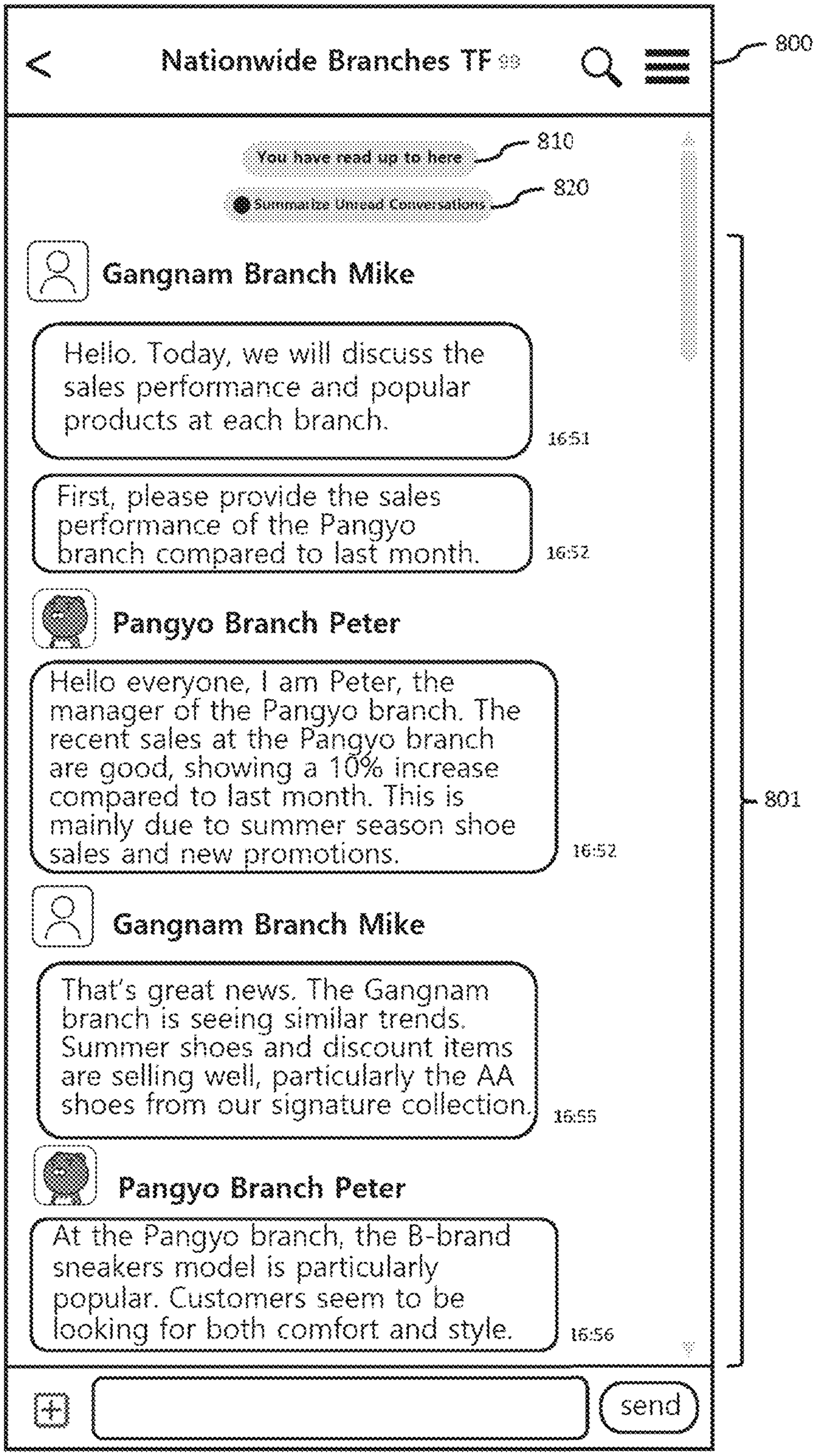

FIG. 8 illustrates a screen where the user terminal 10 displays a chat room 800 including at least one unread message in order to perform operation 203 of FIG. 2.

Referring to FIG. 8, the user terminal 10 may display a chat room 800 including a chat message(s) in response to the user's request to view a chat room. The chat room 800 may include an unread message(s), a chat message area 801, guide information 810 regarding the read status, and a summary request interface 820. The guide information 810 may be displayed between the most recently read message and the unread message(s).

The user terminal 10 may display the summary request interface 820 in the chat room 800. Specifically, the summary request interface 820 may be displayed in an area that separates the read message from the unread message(s).

The user terminal 10 may generate a summary request to the server 20 in response to an interaction with the summary request interface 820. The user terminal 10 may transmit the summary request to the server 20 through the summary request interface 820. Specifically, the user's account on the user terminal 10 may generate a summary request by clicking or touching the summary request interface 820.

Figure 9:
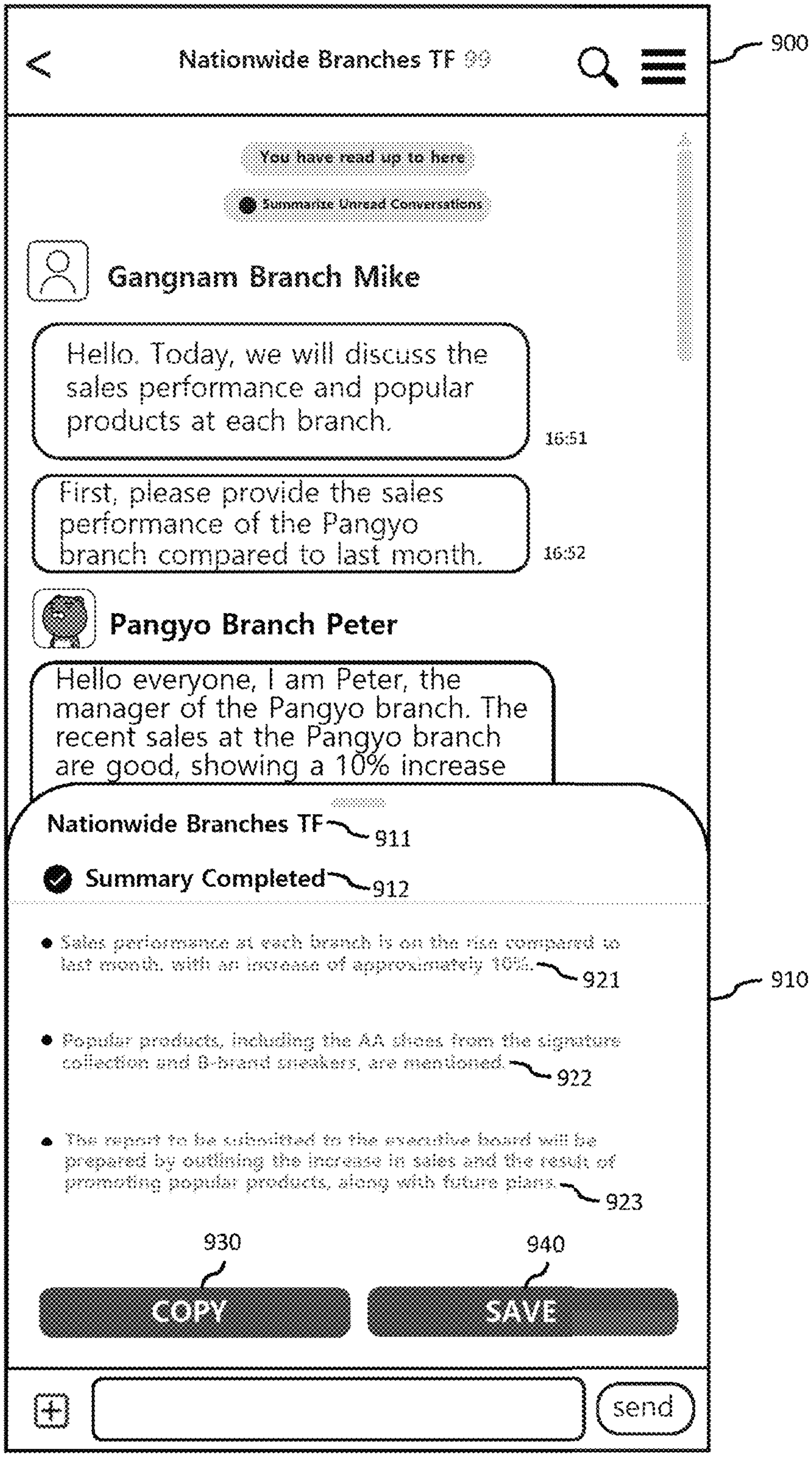

FIG. 9 illustrates a screen where the user terminal 10 displays summary information 910 within a chat room 900 in order to perform operation 205 of FIG. 2.

Referring to FIG. 9, the summary information 910 may include a chat room title 911, a summary status 912, a summary item 921, 922, 923, a copy interface 930, and a save interface 940.

The user terminal 10 may display the summary information 910 including a plurality of summary items 921, 922, and 923. Specifically, the server 20 may generate at least one summary item 921, 922, or 923 based on summary target messages. Specifically, the server 20 may generate a summary item by taking into account the context around keywords or sentences from the summary target messages.

For example, keywords for summary target messages may be "sales performance," "popular products," and "report to the executive board." In this case, based on the unread messages related to those keywords, the server 20 may generate summary information 910 such as a summary item 821 stating "Sales performance at each branch is on the rise compared to last month, with an increase of approximately 10%," a summary item 922 stating "Popular items, including the signature collection AA product and B-brand sneakers, are mentioned," and a summary item 923 stating "The report to be submitted to the executive board will be prepared by outlining the increase in sales and the result of promoting popular products, along with future plans."

The user terminal 10 may display the summary information 910 within the chat room 900. Specifically, the user terminal 10 may display the summary information 910 within the chat room 900 in response to an interaction with a summary request interface within the chat room 900. In this case, the summary information 910 may be included in a chat window or may be displayed in a form that covers at least a part of the chat window. Although not shown in the drawing, the summary information 910 may be displayed in the form of a chat message or a window displayed separately from the chat window.

The user terminal 10 may transmit a copy request for the summary items 921, 922, and 923 to the server 20 in response to an interaction with the copy interface 930. In some cases, the user terminal 10 may transmit the copy request for some of the summary items 921, 922, and 923 rather than all of the summary information 610.

The user terminal 10 may store the summary information 910. Specifically, the user terminal 10 may generate a save request for the summary information 910 in response to an interaction with the save interface 940. In response to the save request, the user terminal 10 may store the summary information 910, information about the chat room, and information about the summary target messages. Specifically, the user terminal 10 may store information such as the chat room name, the number of participants, the details of the summary target messages, the speaker, the time, and whether a specific user is mentioned.

The user terminal 10 may display the summary information and information about the chat room in response to a request to display the stored summary information.

Although not shown in the drawing, the user terminal 10 may transmit a request to share the summary information 910 with a chat room with the user terminal 10 itself or with other users in response to an interaction with a share interface.

Figure 10:
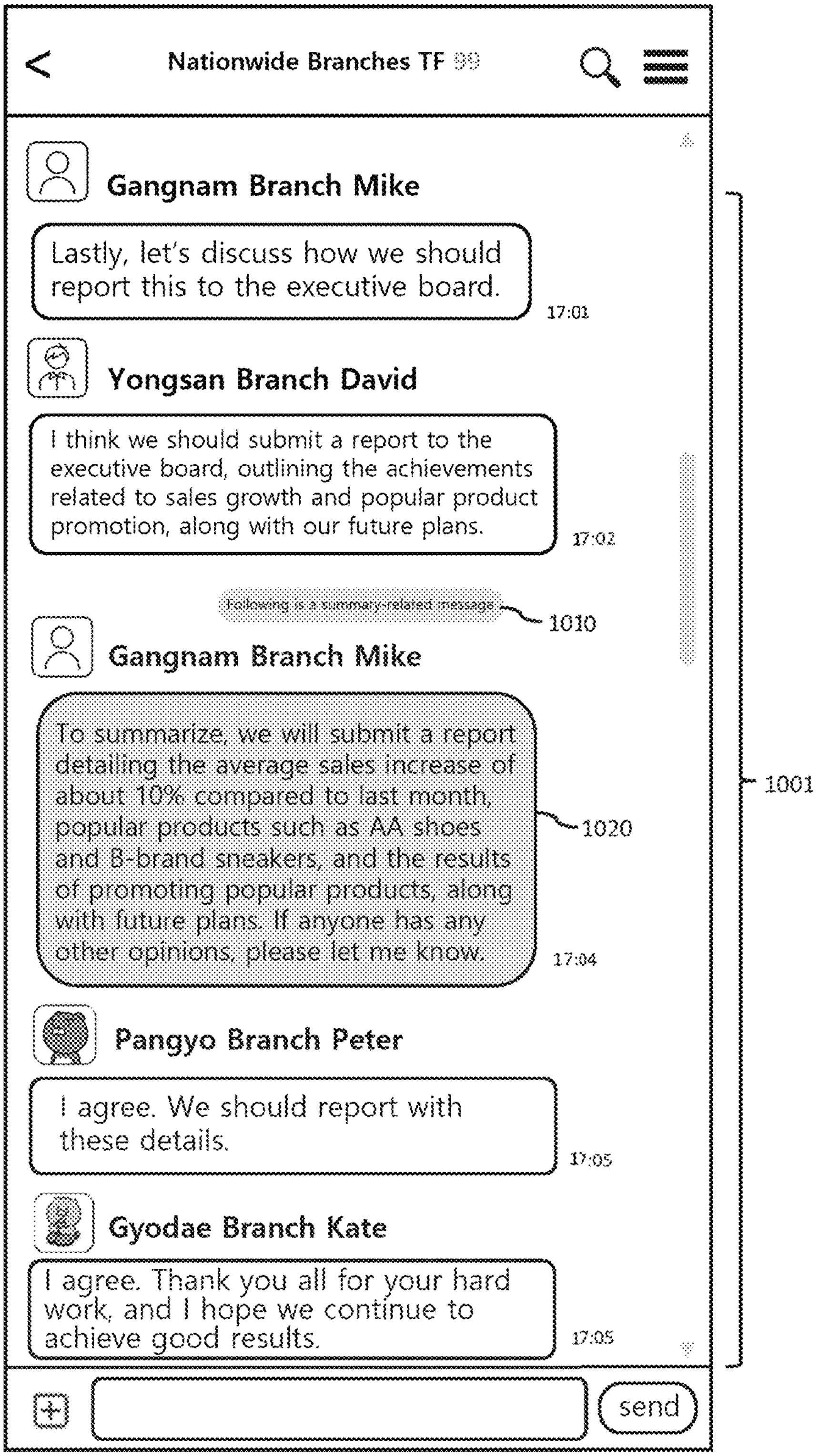

FIG. 10 illustrates a screen 1000 where the user terminal 10 displays an unread message 1020 that includes the above-described summary item.

The screen 1000 in FIG. 10 may be displayed when the user terminal 10 obtains an interaction with summary item 923 in FIG. 9.

Referring to FIG. 10, the user terminal 10 may display an area 1001 including a summary target message related to the summary item. Specifically, in response to an interaction with any of the summary items, the user terminal 10 may display a message related to the corresponding summary item within the chat room.

For example, the user terminal 10 may obtain an interaction with the summary item 923 stating "The report to be submitted to the executive board will be prepared by outlining the increase in sales and the result of promoting popular product promotion, along with future plans" in FIG. 9. In this case, the user terminal 10 may display a message related to the summary item stating "The report to be submitted to the executive board will be prepared by outlining the increase in sales and the result of promoting popular product promotion, along with future plans" within the chat room.

In this case, the user terminal 10 may display the message 1020 related to the summary item to be distinguishable from other messages. Specifically, the user terminal 10 may differentiate the message 1020 related to the summary item by using a different color, shape, or size or by displaying an indicator related to the message. In some cases, the message 1020 related to the summary item may include a plurality messages.

In an area 1001 including the message related to the summary item, the user terminal 10 may display information 1010 about displaying the message related to the summary item. For example, the user terminal 10 show a feed message or a pop-up text such as "Following is a summary-related message" 1010 as information about displaying a message related to the summary item.

Figure 11:
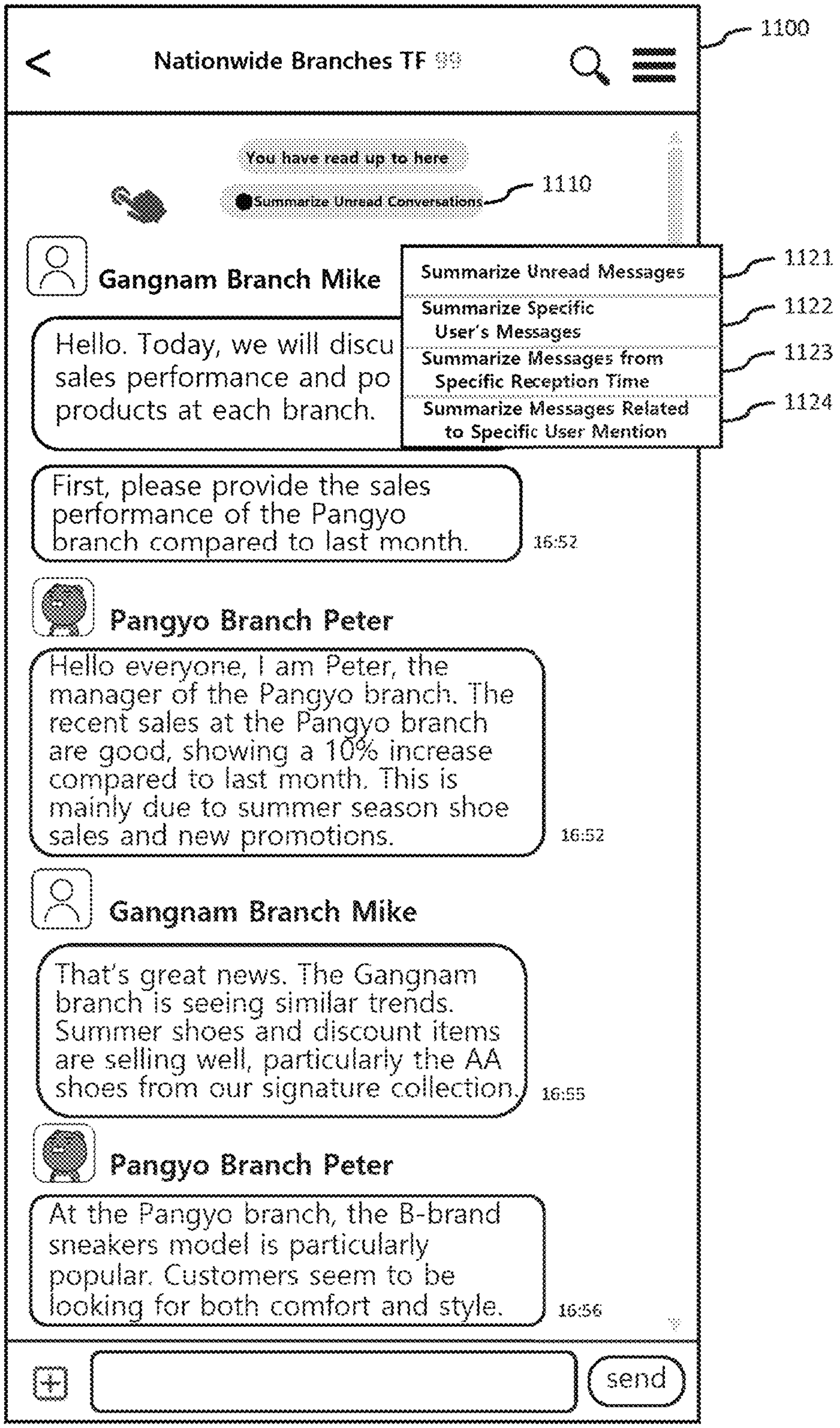

FIG. 11 illustrates a screen where the user terminal 10 transmits a summary request including various conditions within a chat room 1100 to the server 20.

The screen in FIG. 11 may be displayed when the user terminal 10 obtains an input of a long tap or right-click on the summary request interface 520 as shown in FIG. 5.

Referring to FIG. 11, the user terminal 10 may display a chat room 1100 including a summary request interface 1110. The user terminal 10 may transmit a summary request for all unread messages through an interface 1121 to the server 20.

In some cases, the user terminal 10 may transmit a summary request including selection information to the server 20. In this case, the selection information refers to information on selection of a message related to information specified by the user to generate summary information. For example, the user terminal 10 may transmit, to the server 20, the selection information related to the read status, speaker, reception time, or specific user mention of chat messages.

For example, the selection information may correspond to a message from a specific user specified by the user among the summary target messages. In this case, the message from the specific user refers to a message sent by the specific user specified by the user among the summary target messages.

In this case, when the server 20 receives an interaction with a user-specific summary request interface 1122 from the user terminal 10, the server 20 may provide the user terminal 10 with a user selection interface to specify a specific user. The user terminal 10 may then transmit a summary request to the server 20 with a specific user specified through the user selection interface. In some cases, the user may specify a plurality of users. In this case, the user terminal 10 may display summary information about each of the plurality of users.

In another example, the selection information may correspond to a message received at a specific time specified by the user among unread messages. In this case, the specific reception timer refers to a reception time of a summary target message, which falls within a range from the start time to end time specified by the user among unread messages.

In this case, when the server 20 receives an interaction with a time-specific summary request interface 1123 from the user terminal 10, the server 20 may provide a time selection interface for the user terminal 10 to specify the start and end times. The user terminal 10 may then transmit a summary request specifying a particular time range.

For example, if a meeting in the chat room is held from 10 AM to 11 AM and from 2 PM to 3 PM, the user terminal 10 may set the start time as 10 AM and the end time as 3 PM and transmit a summary request for unread messages within this time range. In this case, the server 20 may generate summary information based only on information about messages received in this time range.

In another example, the selection information may correspond to messages mentioning the user of the user terminal 10 among unread messages. A specific user mention may refer to a case where the user's identification information is mentioned. For example, mentioning the user's identification information may include mentioning the user's name, ID, or profile, replies to the user, or specifying the user through a mention or tag feature.

The user terminal 10 may transmit a summary request to the server 10 through an interface 1124 for selection information related to specific user mentions.

Figure 12:
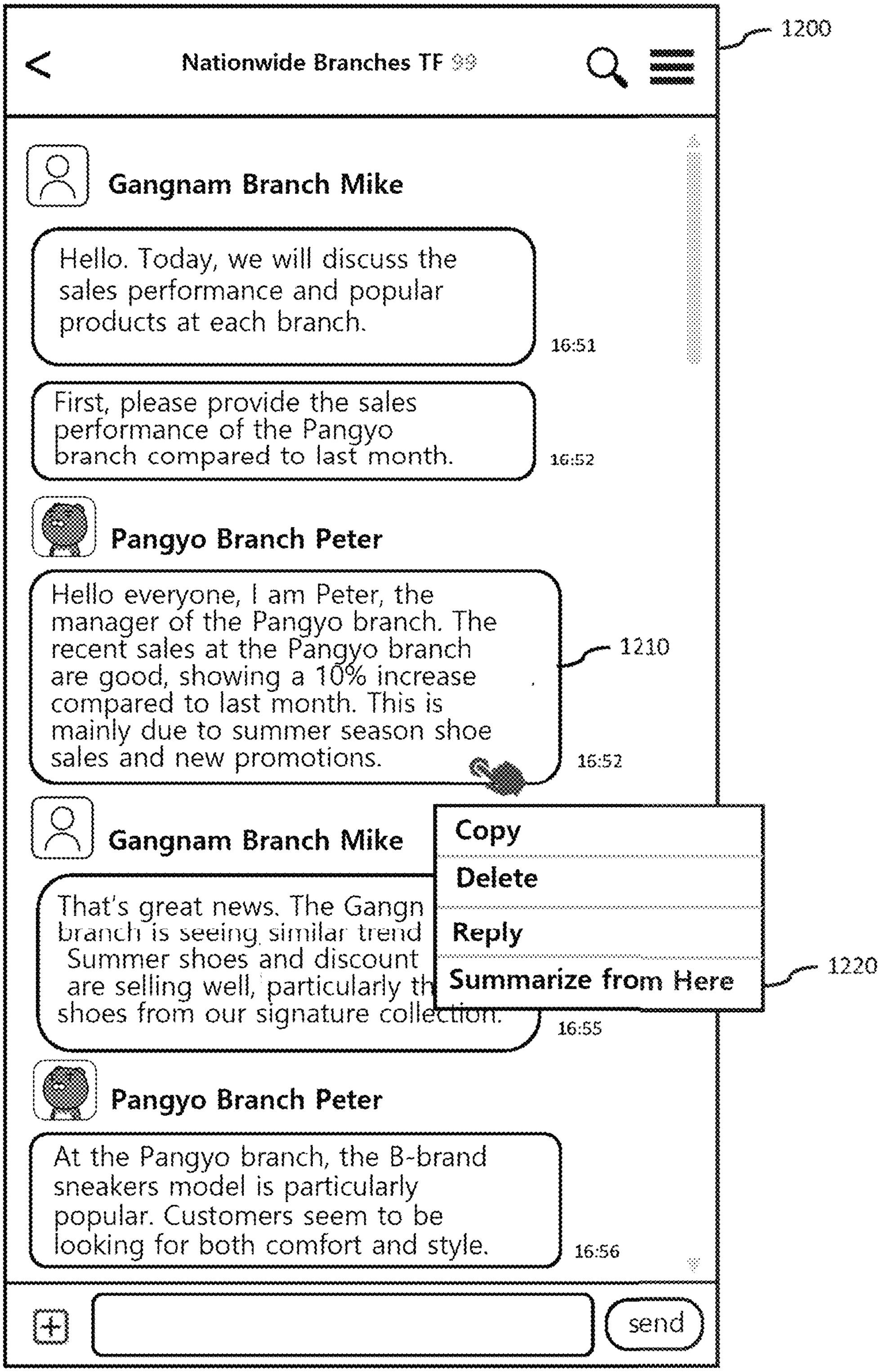

FIG. 12 illustrates a screen where a user terminal 10 transmits a summary request for a specific section within a chat room to the server 20.

Referring to FIG. 12, the user terminal 10 may request a summary of messages in a specific section specified by the user. Specifically, the user terminal 10 may transmit a summary request to the server 20 based on messages in a specific section specified by the user among summary target messages. In this case, the messages in the specific section refer to messages that fall within a range from the start time to end time specified by the user among the summary target messages.

The user terminal 10 may display a partial summary request interface 1220 in response to a long tap or right-click input on a specific message 1210 among the summary target messages. When the server 20 receives an interaction with the partial summary request interface 1220 from the user terminal 10, the server 20 may provide the user terminal 10 with a partial selection interface for specifying the start and end points.

In some cases, the user may select only the start point. Specifically, the user terminal 10 may transmit a summary request to the server 20 with only the start point specified. In this case, the server 20 may generate summary information from the starting message to the most recent unread message.

In some cases, the user terminal 10 may transmit a summary request for messages in a specific section among read messages to the server 20. For example, the messages in the specific section among the read messages may refer to unread messages in a chat room that the user opened. In another example, the messages in the specific section among the read messages may refer to messages that were not actually read in a chat room that the user mistakenly opened.

Figure 13:
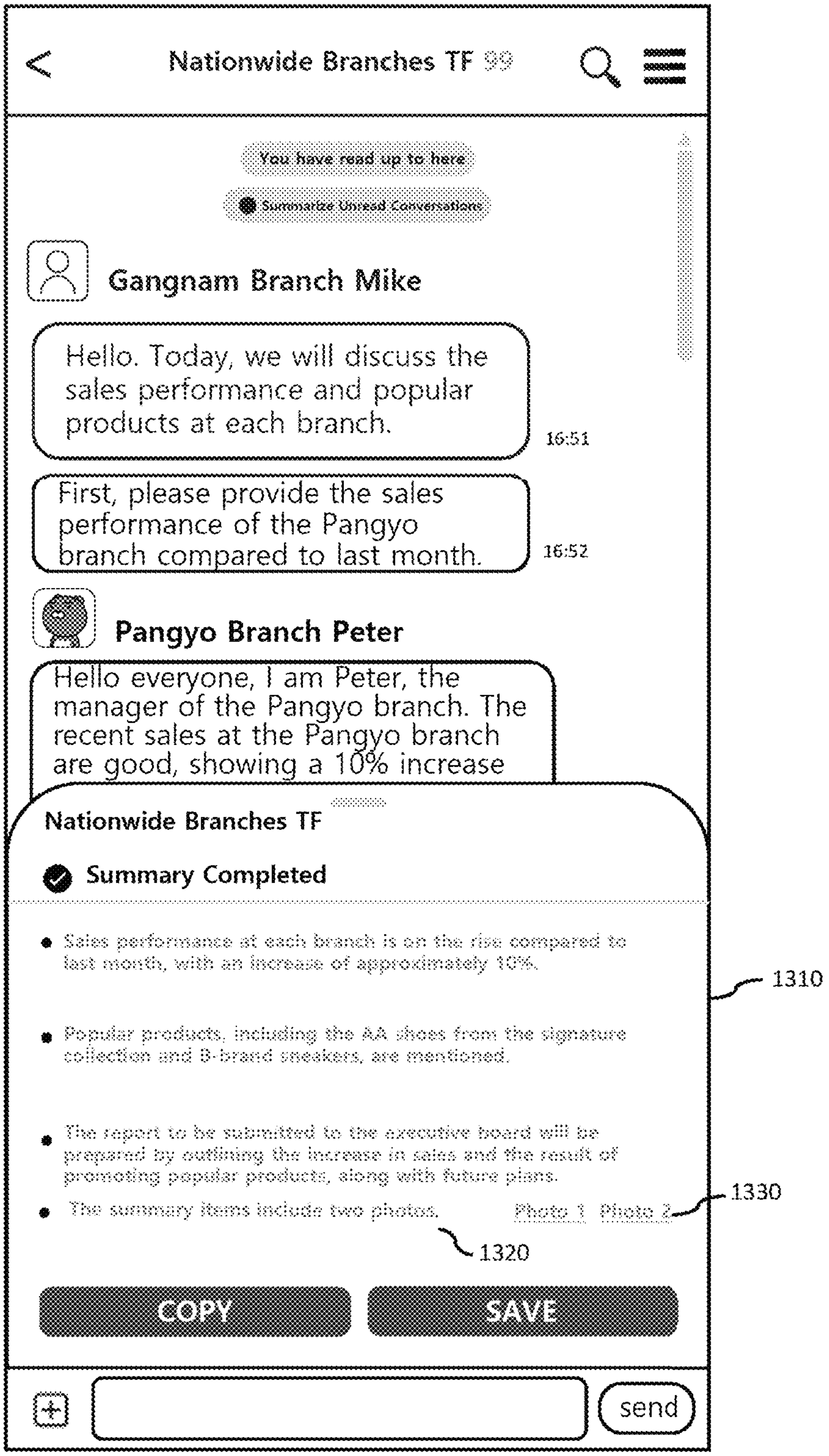

FIG. 13 illustrates a screen on which the user terminal 10 displays summary information 1310 for summary target messages including photos.

Referring to FIG. 13, the summary information 1310 may include a chat room title, a summary status, a summary item, a copy interface, and a save interface. The summary target messages may include various contents.

When the summary target messages include a predetermined type of message, the user terminal 10 may display details 1320 about that predetermined type of message in the summary information 1310. In this case, the predetermined type of message may include at least one of a photo, a video, a multimedia file, a link, a location, or a poll.

For example, the summary target messages may include two photos. In this case, the summary item may include a text such as "The summary target messages include two photos." In this case, the details about the predetermined type of message may include an interface 1330 that links to the predetermined of message. If a plurality of predetermined types of message is included, the user terminal 10 may display a plurality of link interfaces 1330.

In response to an interaction with the interface 1330 linking to the predetermined type of message, the user terminal 10 may display the predetermined type of message.

In some cases, the predetermined type of message may correspond to at least one of the photos included in the summary target messages. Specifically, a photo not related to any summary item may be included in the summary target messages. In these cases, such a photo may not be included in the summary items.

Figure 14:
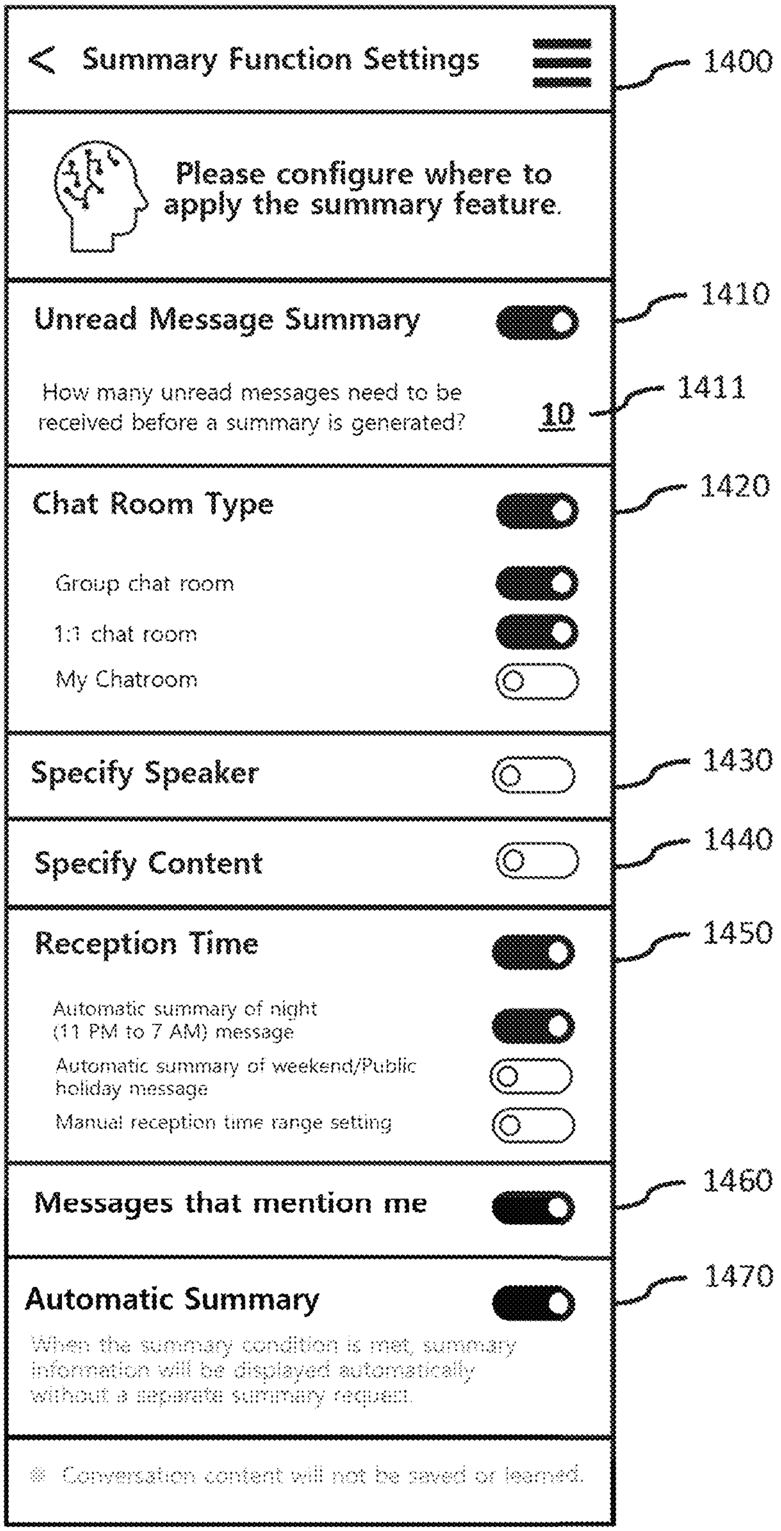

FIG. 14 illustrates a screen where the user terminal 10 displays a feature setting interface 1300 related to an auto-summary feature.

Referring to FIG. 14, the feature setting interface 1400 may include various conditions. Specifically, the feature setting interface 1400 may include an unread message summary setting interface 1410, a chat room type setting interface 1420, a speaker specifying interface 1430, a content specifying interface 1440, a reception time specifying interface 1450, a specific user mention specifying interface 1460, and an auto-summary setting interface 1470.

The user terminal 10 may display a count setting interface 1411 for the number of unread messages in the feature setting interface 1400. The user may determine whether to enable an unread message condition through the unread message summary setting interface 1410 among conditions related to the summary feature. In addition, the user may set the specific number of unread messages through the count setting interface 1411. In this case, the number of unread messages may be set differently between 1:1 chat rooms and group chat rooms.

The user terminal 10 may display the chat room type setting interface 1420 in the feature setting interface 1400. The chat room type setting interface 1420 may include setting interfaces for various types of chat rooms. For example, the chat room type setting interface 1420 may include setting interfaces for group chat room, 1:1 chat room, and My Chatroom. The user may set a specific condition for at least one of group chat room, 1:1 chat room, and My Chatroom through the type setting interface 1420 among the conditions related to the summary feature. For example, the user may allow the summary feature to only apply to group chat rooms.

The user terminal 10 may display the speaker specifying interface 1430 for a specific speaker in the feature setting interface 1400. The user may determine whether to enable a condition for a specific speaker. Additionally, the user may specify a specific user through the speaker specifying interface 1430 among the conditions related to the summary feature. In some cases, a plurality if users may be specified as speakers.

The user terminal 10 may display a content specifying interface 1440 for specific content in the feature setting interface 1400. The user may determine whether to enable a condition for specific content through the content specifying interface 1440 among the conditions related to the summary feature. Additionally, the user may set a specific keyword or topic through the content specifying interface 1440.

The user terminal 10 may display the reception time specifying interface 1450 in the feature setting interface 1400. The reception time specifying interface 1450 may include interfaces for specifying various types of time. For example, the chat room type setting interface 1420 may include setting interfaces for "nighttime (11 PM to 7 AM)," "weekends/holidays," and "manual reception time range settings." The user may determine whether to enable a condition for reception time setting through the reception time specifying interface 1450 among the conditions related to the summary feature. Additionally, the user may set a specific time through the reception time specifying interface 1450.

The user terminal 10 may display the specific user mention specifying interface 1460 in the feature setting interface 1400. In some cases, a specific user mention may be a case where the user is mentioned. The user may determine whether to enable a condition for user mention setting through the specific user mention specifying interface 1460 among the conditions related to the summary feature. Additionally, the user may set a specific user mention through the specific user mention specifying interface 1460.

The user terminal 10 may display the auto-summary interface 1470 in the feature setting interface 1400. In this case, auto-summary refers to automatically displaying summary information when a summary condition is met, without a separate summary request. The user may determine whether to use the auto-summary feature through the auto-summary interface 1470 among the conditions related to the summary feature.

Figure 15:
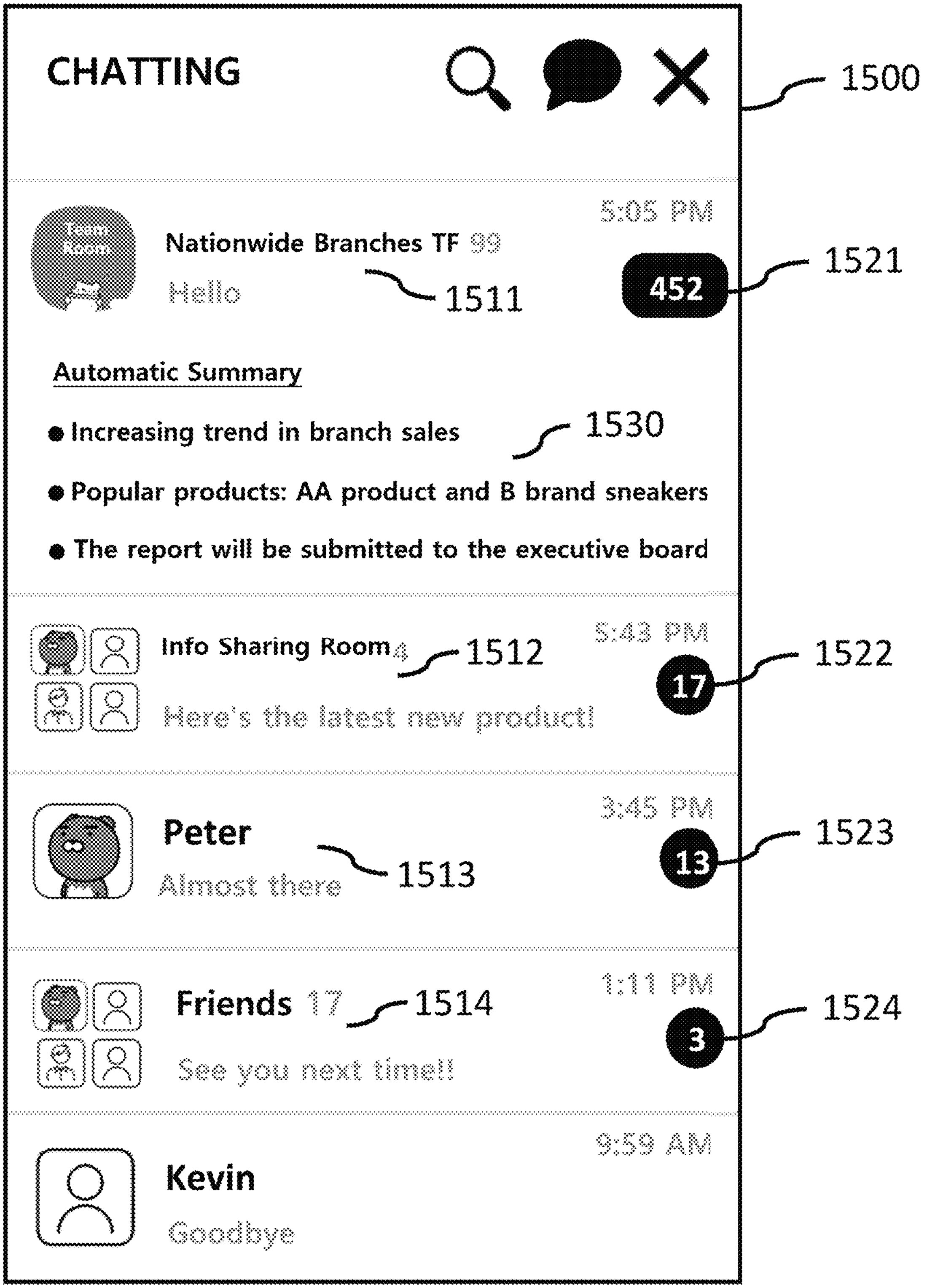

FIG. 15 illustrates a screen where the user terminal 10 displays a chat room list 1500 including an auto-summarized chat room 1511.

Referring to FIG. 15, the chat room list 1500 includes chat rooms 1511, 1512, 1513, and 1514 each including unread messages. The respective chat rooms 1511, 1512, 1513, and 1514 includes information 1521, 1522, 1523, and 1524 on the number of unread messages and summary information 1530.

When at least one of a chat room or chat messages in the chat room satisfies a predetermined conditions, the user terminal 10 may receive and display summary information about summary target messages from the server 20. In this case, the predetermined conditions may relate to at least one of the following: a type of the chat room, the number of unread messages, a read status of chat messages, speakers of the chat messages, content of the chat messages, reception times of the chat messages, and whether a specific user is mentioned.

For example, the server 20 may check if the "Nationwide Branches TF" chat room 1511, which is a group chat room, satisfies a predetermined condition. In this case, the predetermined condition may be "when the number of unread messages is 20 or more." Since the number of unread messages in the "Nationwide Branches TF" chat room is "452" 1521, the server 20 may provide summary information to the user terminal 10 without receiving a summary request from the user terminal 10.

Figure 16:
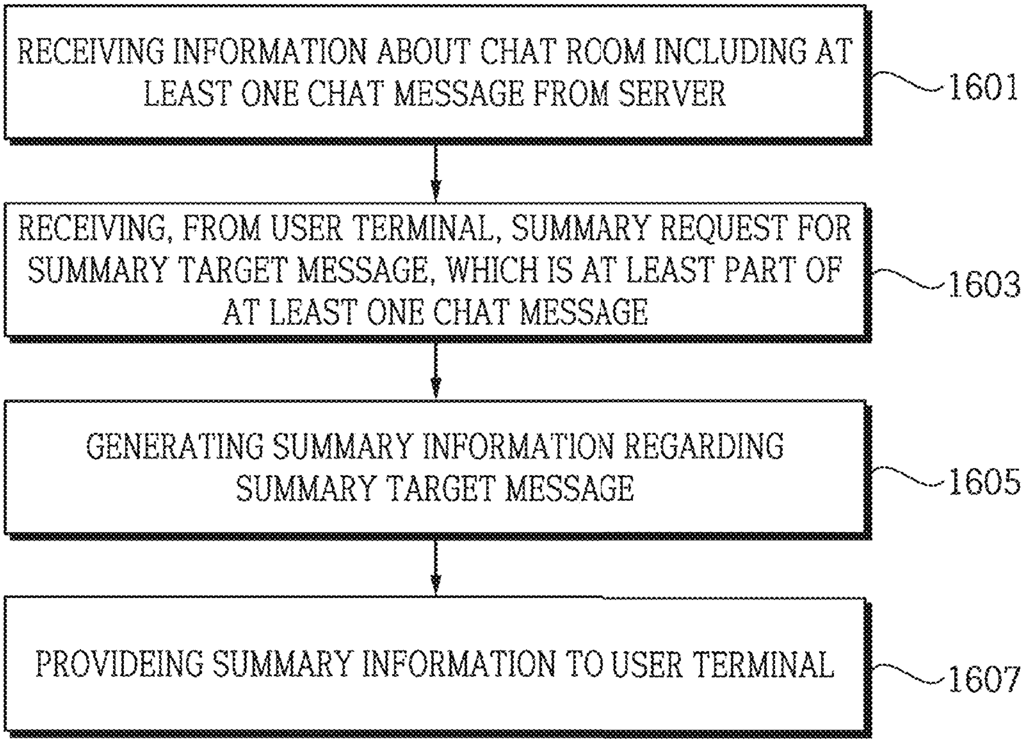
FIG. 16 is a flowchart for explaining a method in which a server of the present disclosure provides summary information to a user terminal through a chat room.

FIG. 16 is a flowchart illustrating a method in which a server 20 of the present disclosure provides summary information to a user terminal 10 through a chat room.

For convenience of explanation, the description of operations in FIG. 16 substantially identical to the operations in FIG. 2 will be replaced with the description referring to FIG. 2.

In operation 1601, the server 20 provides information about the chat room including at least one chat message to the user terminal 10. Since operation 1601 of FIG. 16 is substantially identical to operation 201 of FIG. 2, the description of operation 1601 of FIG. 16 will be replaced with the description of step 201 of FIG. 2.

In operation 1603, the server 20 receives a summary request for at least some of the chat messages, which are summary target messages, from the user terminal 10. Since operation 1603 of FIG. 16 is substantially identical to operation 203 of FIG. 2, the description of operation 1603 of FIG. 16 will be replaced with the description of operation 203 of FIG. 2.

In operation 1605, the server 20 generates summary information about the summary target messages. Since operation 1605 of FIG. 16 is substantially identical to operations 203 and 205 of FIG. 2, the description of operation 1605 of FIG. 16 will be replaced with the description of operations 203 and 205 of FIG. 2.

In operation 1607, the server 20 provides the summary information to the user terminal. Since operation 1607 of FIG. 16 is substantially identical to operation 205 of FIG. 2, the description of operation 1607 of FIG. 16 will be replaced with the description of operation 205 of FIG. 2.

According to the method for displaying summary information of the present disclosure, it is possible to send messages through a chat room, to generate summary information based on the messages, and to provide summary information to a user who is not involved in the conversation in the chat room.

According to the method for displaying summary information of the present disclosure, it is possible to providing necessary summary information to a user by selecting only desired unread messages among chat messages in a chat room.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method for displaying summary information of chat messages by a user terminal comprising a processor, a memory, a communication unit and a display device, the method comprising:

receiving information about a group chat room comprising chat messages from a server, the group chat room being participated by a user of the user terminal and other multiple chat users, the group chat room comprising unread chat messages created by the other multiple chat users and unread by the user of the user terminal;

displaying the information about the group chat room on the display device;

automatically requesting, by the user terminal, the server to summarize the unread chat messages when the user terminal determines that a predetermined condition is satisfied, without a separate summary request interaction from the user;

receiving summary information for the unread chat messages from the server; and displaying the received summary information on the display device in a region of a chat window of the group chat room that corresponds to unread chat messages.

2. The method of claim 1, further comprising:

prior to requesting the server to summarize the unread chat messages of the group chat room, displaying a chat room list comprising the group chat room, wherein, in receiving and displaying the summary information, the summary information is included in the chat room list or displayed in a form that covers at least a part of the chat room list.

3. The method of claim 1, wherein the summary information comprises at least one summary item, and wherein the method further comprises:

receiving an interaction with any one of the at least one summary item after receiving and displaying the summary information; and in response to the interaction, displaying a message related to any one of the at least one summary item.

4. The method of claim 3, wherein, in displaying a message related to the any one of the at least one summary item, the message is displayed to be distinguishable from other messages in the chat window of the group chat room.

5. The method of claim 1, wherein the summary information comprises at least one summary item categorized by a speaker of at least one chat message.

6. The method of claim 5, wherein, in the summary information, the speaker of the at least one chat message is displayed with an anonymized name.

7. The method of claim 1, further comprising:

storing the summary information as separate storage information, after receiving and displaying the summary information; and in response to a request to display the stored information, displaying the summary information and information about the group chat room.

8. The method of claim 1, wherein the predetermined condition relates to at least one of the following: a type of the group chat room, a number of unread messages, a read status of chat messages, a speaker of the chat messages, contents of the chat messages, a reception time of the chat messages, or a specific user mentioned in the chat messages.

9. The method of claim 1, wherein when the unread chat messages comprise a predetermined type of message, the summary information comprises details about the predetermined type of message.

10. The method of claim 1, wherein the automatic requesting is enabled or disabled via an auto-summary interface displayed on the display device.

11. The method of claim 1, wherein the automatic requesting is performed based on reception times of the unread chat messages and a determination that the unread chat messages have not been read for at least a predetermined time period.

12. The method of claim 1, wherein the predetermined condition is met when a number of the unread chat messages is greater than a threshold number.

13. A user terminal displaying summary information about a chat message, the user terminal comprising:

a memory storing instructions, and a processor configured to execute the instructions to:

receive information about a group chat room comprising chat messages from a server, the group chat room being participated by a user of the user terminal and other multiple chat users, the group chat room comprising unread chat messages created by the other multiple chat users and unread by the user of the user terminal;

display the information about the group chat room on the display device;

automatically request, by the user terminal, the server to summarize the unread chat messages when the user terminal determines that a predetermined condition is satisfied, without a separate summary request interaction from the user;

receive summary information for the unread chat messages from the server; and display the received summary information on the display device in a region of a chat window of the group chat room that corresponds to unread chat messages.

14. A method for providing a summary of chat messages by a server, the method comprising:

provide information about a group chat room comprising chat messages to a user terminal, the group chat room being participated by a user of the user terminal and other multiple chat users, the group chat room comprising unread chat messages created by the other multiple chat users and unread by the user of the user terminal;

provide summary information for the unread chat messages to the user terminal; and cause the user terminal to:

display the information about the group chat room on the display device;

automatically request the server to summarize the unread chat messages when the user terminal determines that a predetermined condition is satisfied, without a separate summary request interaction from the user; and display the received summary information on the display device in a region of a chat window of the group chat room that corresponds to unread chat messages.

* * * * *